United States Patent
Pao et al.

(10) Patent No.: US 10,592,590 B2
(45) Date of Patent: Mar. 17, 2020

(54) NON-RESIDENT FONT PREVIEW

(71) Applicant: ADOBE INC., San Jose, CA (US)

(72) Inventors: I-Ming Pao, Palo Alto, CA (US); Alan Lee Erickson, Highland Ranch, CO (US); Yuyan Song, Milpitas, CA (US); Seth Shaw, San Francisco, CA (US); Hailin Jin, San Jose, CA (US); Zhaowen Wang, San Jose, CA (US)

(73) Assignee: Adobe Inc., San Jose, CA (US)

(*) Notice: Subject to any disclaimer, the term of this patent is extended or adjusted under 35 U.S.C. 154(b) by 45 days.

(21) Appl. No.: 15/229,108

(22) Filed: Aug. 4, 2016

(65) Prior Publication Data

US 2018/0039605 A1 Feb. 8, 2018

(51) Int. Cl.
- *G06F 17/22* (2006.01)
- *G06F 17/21* (2006.01)
- *G06Q 20/40* (2012.01)
- *G06Q 20/12* (2012.01)
- *G07F 17/16* (2006.01)

(52) U.S. Cl.
CPC ......... *G06F 17/214* (2013.01); *G06Q 20/123* (2013.01); *G06Q 20/40* (2013.01); *G07F 17/16* (2013.01)

(58) Field of Classification Search
CPC ...... G06F 17/214; G06F 3/0482; G06F 1/212; G06F 17/2205; G06F 3/04842; G06F 8/38; G06Q 20/123; G06Q 20/40
USPC ....................................................... 715/269
See application file for complete search history.

(56) References Cited

U.S. PATENT DOCUMENTS

| | | | | |
|---|---|---|---|---|
| 9,317,777 B2* | 4/2016 | Kaasila | ............ | G06F 17/214 |
| 2010/0107062 A1* | 4/2010 | Bacus | ............ | G06F 17/212 |
| | | | | 715/269 |
| 2010/0313198 A1* | 12/2010 | Chaudhri | ............ | G06F 8/61 |
| | | | | 717/174 |
| 2012/0130792 A1* | 5/2012 | Polk, Jr. | ............ | G06Q 30/0225 |
| | | | | 705/14.26 |
| 2013/0215126 A1* | 8/2013 | Roberts | ............ | G06F 17/214 |
| | | | | 345/522 |
| 2014/0019856 A1* | 1/2014 | Hernandez | ............ | G06F 17/214 |
| | | | | 715/269 |
| 2014/0035927 A1* | 2/2014 | Buckley | ............ | G06F 17/214 |
| | | | | 345/467 |
| 2016/0092411 A1* | 3/2016 | Martin | ............ | H04L 51/043 |
| | | | | 715/269 |
| 2016/0314377 A1* | 10/2016 | Vieira | ............ | G06Q 30/0631 |
| 2017/0091155 A1* | 3/2017 | Rajashekara | ............ | G06F 3/0482 |

* cited by examiner

*Primary Examiner* — Wilson W Tsui
(74) *Attorney, Agent, or Firm* — Shook, Hardy & Bacon L.L.P.

(57) ABSTRACT

Embodiments of the present invention are directed at providing a font similarity preview for non-resident fonts. In one embodiment, a font is selected on a computing device. In response to the selection of the font, a pre-computed font list is checked to determine what fonts are similar to the selected font. In response to a determination that similar fonts are not local to the computing device, a non-resident font list is sent to a font vendor. The font vendor sends back previews of the non-resident fonts based on entitlement information of a user. Further, a full non-resident font can be synced to the computing device. Other embodiments may be described and/or claimed.

19 Claims, 8 Drawing Sheets

NON-RESIDENT FONT PREVIEW

BACKGROUND

Users who design content (e.g. content designers) often utilize a variety of fonts as part of content creation, such as to generate marketing materials, presentations, books, and so forth. These fonts are utilized to produce text that conveys information to an audience in the content created. As such, the fonts utilized in content creation are one of the major elements in content design. The number of fonts available to these users is continually increasing with tens of thousands of fonts currently available. As such, identifying the exact font that a user who designs content feels best conveys the desired information and best fits other design elements (e.g., images) of the content can be a difficult task. In some instances, a user who designs content is able to identify a font that is similar in appearance to what is desired by the user. In other instances, the user could have settled on a font to utilize for the content creation, but may want to find a font, similar in appearance, that may provide an even better fit for the desired content. As such, these users may wish to identify fonts that are similar to a currently selected font. As a users decides between different fonts, it is helpful to be able to preview how the content design looks with various fonts.

Identifying fonts that are similar to a given font is a known problem. Under the current state of the art, a user can utilize a list of pre-determined font representations, such as a feature vector of a font, to identify fonts that are similar to a given font. For fonts installed on the user's computing device, the user can preview characters of the similar fonts. This preview gives users an idea of what the font will look like when applied to their content design before applying the font to the design. However, under the current state of the art, a user is limited to previewing only those fonts that have been installed on the user's computer system.

SUMMARY

Embodiments of the present invention are directed towards implementing a font similarity system that is capable of previewing non-resident, or uninstalled, fonts within a design application. To accomplish this previewing of non-resident fonts within a design application, the font similarity system is configured to utilize a font feature list comprised of both resident, or locally installed fonts, and non-resident fonts that have yet to be installed. The font feature list can include information for each font that is capable of being utilized to determine a level of similarity between a given font and one or more other fonts of the font feature list. As such, the font feature list can be utilized to identify fonts, both resident and non-resident, that are similar to a user selected font. The identified resident fonts can be previewed by a user of the design application based on installed font information. The identified non-resident fonts, in contrast, can be sent to a font server, which can respond with at least a subset of character information for the identified non-resident fonts. The user can then preview the resident fonts, in conjunction with the non-resident fonts via the subset of character information.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Figure 1:
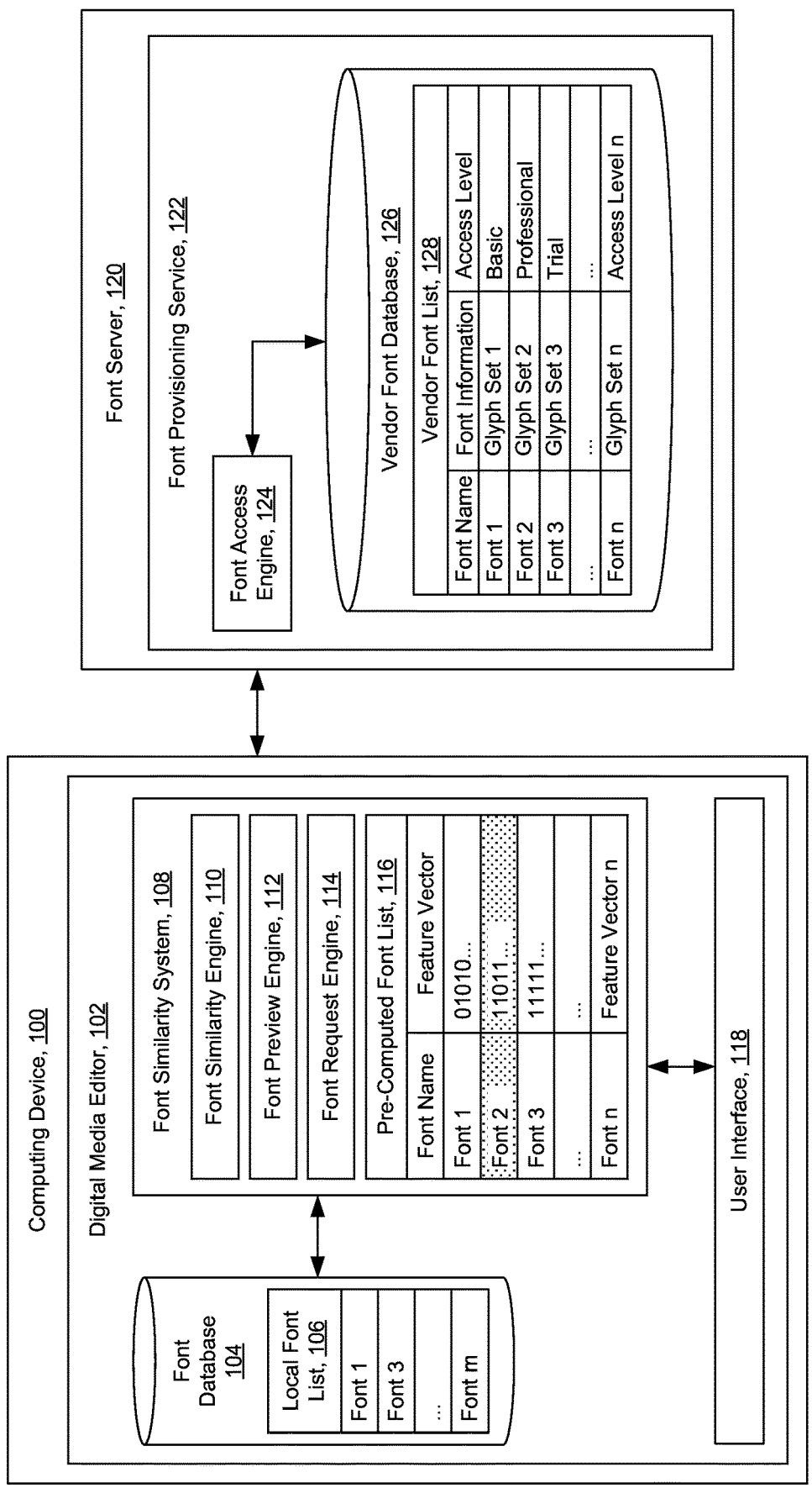
FIG. 1 depicts aspects of an illustrative computing device for implementing a font similarity system and an illustrative font server for implementing a font provisioning service, in accordance with various embodiments of the present disclosure.

Fonts are one of the core tools in the tool box of a user who designs content. Choosing the right font for a design can be a very time consuming task that can be based on any number of factors. One of the main factors in choosing a font is the visual appearance of the font. In some instances, a user may have chosen a font to utilize for a design, but is wondering if there are any visually similar fonts that may be a better fit for the design. Currently, the user can utilize a list of pre-computed font representations to identify fonts that are similar to a given font. While the list of pre-computed font representations can be utilized to identify fonts that are similar to the given font, the user cannot preview any similar fonts that are not installed on the user's computer. This results in the user having to leave the design application and go to another source (e.g., font vendor website) to view fonts that are absent from the user's local system. As used in this context, an absent font refers to a font that is not installed on the system being utilized by the user. As such, a user is currently restricted to previewing only fonts that are installed to the user's local system. This can cause the user designing content to overlook, for example, fonts that the user has access to, for example, on a font vendor, but have not yet been installed on the user's local system; newly released fonts that may be a better fit for the design; or any other fonts that have not been installed to the local system. In addition, if a user is not satisfied with the similar fonts on the user's system, it is time consuming and interruptive to leave the design application and go to a vendor webpage to find a better suited font.

Some embodiments of the present invention are directed towards implementing a font similarity system that can preview both resident fonts via local font information and can preview non-resident fonts via font information acquired from a remote font source (e.g., font vendor). To accomplish this, the font similarity system can be configured to interact with a font vendor to provide a user with previews of non-resident fonts without the user having to leave the design application. The previewed fonts that are non-resident, or not local, to the user's computer, in some embodiments, can include fonts that the user is entitled to install based on a user access level associated with the user. Such a user access level can be, for example, the level associated with a premium subscription holder for a font vendor. In such embodiments, the user can select to install these non-resident fonts, to which the user has full access, onto the local system based on the preview. In other embodiments, fonts outside the user's access level may be previewed as well to enable the user to determine whether to acquire access to these fonts. In such embodiments, the user could also be presented with an option to purchase, or otherwise gain access to those fonts.

To accomplish the above, a font similarity system interacts with a font vendor, by transmitting a list of non-resident fonts that are similar to the user's selected font. In some embodiments, the font similarity system can also provide entitlement information to the font vendor that identified the access level to which the user belongs. In such embodiments, the font vendor can compare the access level of the user to the access level required to access each font on the non-resident font list. For each non-resident font that the user is authorized to access, the font vendor can return a subset of the font character information that the font similarity system can then use to display a preview of each font to the user (e.g., via a user interface of a design application). This subset of font character information can include, for example, font character information to spell 'Sample,' spell out the font name, or even preview specific text selected by the user (e.g., from the current content design). Based on the preview of these non-resident fonts, if the user wants to apply a selected font to the current content design, the user is able to acquire the complete character information for the selected font from within the application. The user can then apply the selected font to the content design. Such a font similarity system enables a content user to preview a similar font even when that similar font has not yet been installed on the user's local system.

Figure 10:
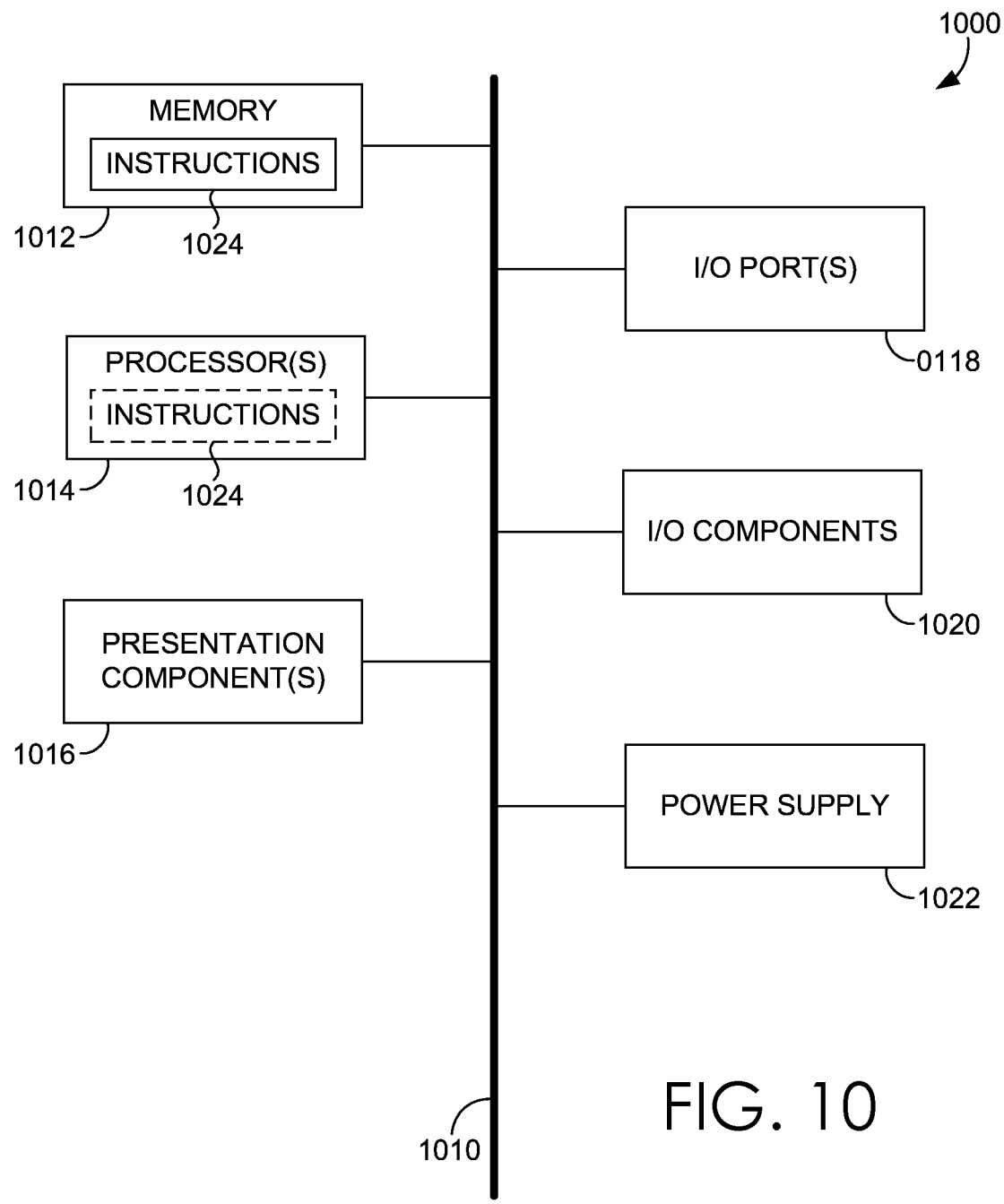
FIG. 10 is a block diagram of an example computing device in which embodiments of the present disclosure may be employed.

FIG. 1 depicts an example configuration of an illustrative computing device 100 for implementing a font similarity system 108 within a digital media editor 102, in accordance with various embodiments of the present disclosure. Computing device 100 can be any type of computing device, an example of which is depicted in FIG. 10. As depicted, computing device 100 includes a digital media editor 102.

Digital media editor 102 can be any editor capable of editing digital media. As used herein, digital media can include, for example, marketing materials, presentations, documents, books, posters, and the like. Digital media editor 102 can include, for example, ADOBE® Illustrator, ADOBE® Photoshop, ADOBE® InDesign (all available from Adobe Systems Inc. of San Jose, Calif.), or any other suitable digital media editor.

Digital media editor 102 includes, among other things, font database 104, font similarity system 108, and user interface 118. Font database 104 depicts a repository for storing fonts that are available for use within digital media editor 102. While referred to herein as a database, it will be appreciated that font database 104 can take the form of any other suitable storage mechanism. Font database 104 includes local font list 106. Local font list 106 represents a list of fonts that have been installed for use by a user of digital media editor 102. Local font list 106 can include any number or type of fonts. For instance, local font list 106 can include any of tens of thousands of fonts that represent TypeKit fonts, OpenType fonts, and the like. Local font list 106 can include fonts that have been installed by a user of computing device 100, as well as those fonts that may have been installed in conjunction with the installation of digital media editor 102 or another application.

Font database 104 is coupled with font similarity system 108. Font similarity system 108 is configured to enable a user of digital media editor 102 to preview fonts from local font list 106 and fonts from a non-resident font list, that are identified as being similar to a given font (e.g., user selected font). To accomplish the identification and preview of similar fonts, font similarity system 108 includes a font similarity engine 110, font preview engine 112, and a pre-computed font list 116.

Pre-computed font list 116 correlates font identifiers (e.g., font name) with respective font representations (e.g., feature vector) that can be utilized for determining font similarity. These font identifiers can include identifiers for fonts that have been installed for use within digital media editor 102 as well as font identifiers for fonts that have yet to be installed for use within digital media editor 102. For example, pre-computed font list 116 can be provided by font server 120. The representation of each identified font can include, for example, a font feature vector that is a numerical representation of font appearance. Such a font feature vector can be generated utilizing machine learning techniques, especially deep learning techniques, such as, for example, a convolutional neural network. An example of such a convolutional neural network is represented by DeepFont (available from Adobe Systems Inc. of San Jose, Calif.).

Pre-computed font list 116 is depicted as including representations for fonts 1 through 'n.' The font representations in pre-computed font list 116 cover the fonts in local font list 106. In addition, it can be seen in this depiction that pre-computed font list 116 includes representations of fonts (e.g., font 2) that are not included in local font list 106. While only a single font representation is explicitly depicted as included within pre-computed font list 116 but not included within the local font list, it will be appreciated that pre-computed font list 116 can include any number of additional font representations that have not yet been installed for use by digital media editor 102 and therefore do not appear in local font list 106. Additionally, in this depiction, the fonts included in pre-computed font list 116 are the same as the fonts in vendor font list 128. It should be appreciated that pre-computed font list 116 can include fonts from multiple font vendors and, as such, the fonts represented in pre-computed font list 116 may not be identical to the fonts included in vendor font list 128.

Vendor font list 128 includes a font list that correlates font identifiers (e.g., font name) with respective font information. This font information can be comprised of glyphs represented by 'glyph set 1' through 'glyph set n.' A glyph, as used in this context, refers to a symbol, or image, intended to represent a character for the purposes of representing textual content. For example, in the font 'Broadway' the glyphs: A B C 1 2 3, represent capital letters A, B, and C and numbers 1, 2, and 3. It should also be appreciated that glyphs do not necessarily depict traditional letters or numbers, for example, in the font 'Webdings' the glyphs: ✔ ⚙ ☐ ☐ ⚐ ◂, represent capital letters A, B, and C and numbers 1, 2, and 3.

In some embodiments, vendor font list 128 also includes an access level associated with each font. The access levels are used to indicate a level of access necessary to acquire the associated font. The access level for each font can correspond, for example, with a subscription level required to access the font. For example, a trial subscription level can include fonts which are offered by the font vendor on a trial basis. A basic subscription level, for example, includes a first subset of fonts. A professional subscription level can include the first subset of fonts and a second subset of fonts that may be more specialized in nature. In addition, some fonts can be considered open access for which no access level may be required to preview or access a given font. In other embodiments, whether a user has access to a font could be determined from a list of fonts identified within an account associated with a user (e.g., fonts purchases by the user). It will be appreciated that these access levels associated with each font are merely meant to be illustrative and that any other mechanism for access control to a font can be utilized without departing from the scope of this disclosure.

Font similarity engine 110 can be configured to receive input from a user (e.g., selection via user interface 118) indicating that the user would like to view a preview of fonts that are similar to a given font. In response to receiving the user input, font similarity engine 110 can retrieve a font representation (e.g., a feature vector) for the given font from the pre-computed font list 116. The font similarity engine 110 can then identify fonts that are similar to the given font based on a comparison between the retrieved font representation for the given font and the other font representations included within pre-computed font list 116. For example, font similarity engine 110 can compare the given font and a different font by calculating a font similarity score between the font representation of the given font and the font representation of the different font. Such a font similarity score can be indicative of how similar, or dissimilar, other fonts are to the given font. The font similarity score can be determined by calculating, for example, an inner product or Euclidean distance between the font representation of the given font and the font representation of the different font. When calculating the inner product, a larger number would be indicative of two font representations being more similar than a smaller score. When calculating a Euclidean distance, a smaller score would be indicative of two font representations being more similar than a larger score. It should also be appreciated that in some embodiments, a threshold value, also referred to herein as a threshold of similarity, is used to select fonts that are similar to the given font where fonts with a score above (e.g. for embodiments utilizing an inner product as the similarity score) or below (e.g. for embodiments utilizing a Euclidean distance as the font similarity score) a specified threshold value are determined to be similar. Such a threshold value could be determined in any suitable manner, such as, for example, being pre-defined, being programmatically determined, being based on the number of similar fonts which are to be returned, etc.

Font preview engine 112 takes the fonts identified by font similarity system engine 110 as being similar to the given font and determines which fonts are local, or resident, fonts (e.g., fonts already installed for use on the computing device), and which fonts are non-resident (e.g., fonts that have yet to be installed for use on the computing device). As an example, consider font 2 depicted in the pre-computed font list 116, but absent from the local font list 106. Such a font would be considered to be non-resident. To accomplish this, font preview engine 110 can be configured to compare the identified fonts with local font list 106 to compile a non-resident font list that includes those fonts that are identified as being similar to the given font, but not included within local font list 106.

Once the non-resident font list has been compiled, font preview engine 112 can send a non-resident font preview request that includes the non-resident font list to font server 120. While font server 120 is depicted and referred to generally herein as a single server, it will be appreciated that font server 120 could include, or be, one of many font servers that are adapted to perform the process and procedures described herein. In addition, font server 120 could be associated with one or more font providers, also referred to herein as font vendors. In some embodiments, the font request submitted to font server 120 can also include entitlement information associated with the user operating the design application to font server 120, to enable font server 120 to take into account those fonts to which the user has access. In such embodiments, the entitlement information can be utilized to, for example, determine the subscription or access level to which the user belongs. For instance, the entitlement information can include credentials associated with the user, or computing device 100, such as, for example, a user identifier (e.g., username) and token (e.g., password).

Font provisioning service 122, located on font server 120, is configured to process the non-resident font preview request received from computing device 100. To accomplish this, font provisioning service 122 includes a font access engine 124 and a vendor font database 126 that contains vendor font list 128.

Font access engine 124 is configured to initially extract information from the non-resident font preview request sent from computer 100. In an embodiment, such information can include the non-resident font list and, if included, the entitlement information for the user. Font access engine 124 can utilize the non-resident font list to identify those fonts from vendor font list 128 for which a preview has been requested. Once identified, the font access engine can extract a subset of character information from vendor font database 126 for each of the identified fonts. The character information includes characters (e.g., glyphs) for the identified fonts on the non-resident font list. Additionally, font access engine 124 can send the subset of character information back to computing device 100. The subset of character information could comprise the characters required to spell a certain word associated with the preview, for example, 'SAMPLE' or spell out the font name. In a further embodiment, the information extracted from the non-resident font preview request can include a request for a specific subset of character information so that a user is enabled to preview a specific word or words that make up the design being created in digital media editor 102. In such embodiments, font access engine 124 can be configured to extract the specific subset of character information from each of the fonts identified in the non-resident font list.

In some embodiments, font access engine 124 can be configured to process the non-resident font preview request regardless of any entitlement information associated with the font preview request. In such embodiments, the user can be considered to be authorized to preview any fonts, regardless of access levels associated with each individual font. In other embodiments, font provisioning service 122 can process a non-resident font preview request received from computing device 100 in accordance with user entitlement information. Such user entitlement information can be utilized to determine what fonts on the non-resident font list the user associated with the non-resident font preview request has access to preview and/or install. Such entitlement information can be included in the information extracted from the non-resident font preview request. Font access engine 124 can extract entitlement information, in addition to the non-resident font list, from the non-resident font preview request. Font access engine 124 can use this extracted information to compare the user entitlement information with the access level required to preview and/or install each font on the non-resident font list.

In some embodiments, font access engine 124 can extract subsets of character information (e.g., from the depicted glyph sets) from vendor font database 126 for those fonts on non-resident font list that the user has entitlement to access for preview and/or install. In other embodiments, font access engine 124 can extract subsets of character information for all fonts on the non-resident font list; however, installation of the fonts can be restricted to those fonts for which the user has access to install. It will be appreciated that the entitlement information can enable the user to preview a first subset of fonts while being able to install a second subset of fonts. It will also be appreciated that the first subset of fonts can include the second subset of fonts, such that the user can preview more fonts than the user has access to install. Font access engine 124 can then send the extracted subsets of character information back to computing device 100 for each font to enable a user to preview the non-resident fonts for which the user has access to preview and/or install.

Upon receipt of the subsets of character information on computing device 100, digital media editor 102 is capable of displaying a font preview to the user via user interface 118, utilizing the subsets of character information. In one embodiment, a font preview can include the name of the font and the subset of character information (e.g., subset of glyphs). In a further embodiment, a font preview can include an icon indicating the source of the font. For example, an icon indicating a font vendor that sent the subset of character information to preview a given non-resident font. An illustrative depiction of a user interface displaying font previews is depicted in reference to FIG. 9.

Example processes or procedures that can be carried out by font preview engine 112 and font access engine 124 are described in more detail below in reference to FIGS. 2 through 7.

In embodiments where the user is able to preview fonts that the user is unable to install due to the user lacking access to such fonts, font request engine 114 can be configured to receive input from a user (e.g., selection via user interface 118) indicating that the user would like to obtain access to install, or sync, a selected font. Upon receiving such input, font request engine 114 sends a non-resident font request, containing an identifier of the selected non-resident font, to font access engine 124 of font provisioning service 122. In one embodiment, font access engine 124 returns complete character information for the selected non-resident font to computing device 100. It should be appreciated that complete character information can include each character, or glyph, for a selected non-resident font. In another embodiment, font access engine 124 can return delta character information that represents the delta between the complete character information for the selected non-resident font and the subset of character information that was previously sent for the above described font preview. This approach can be used to save bandwidth and computing resources by not returning.

In a further embodiment, in response to receiving a request to obtain access to install a font, font access engine 124 determines whether the user is entitled, or authorized, to install the selected non-resident font utilizing entitlement information, such as that described above. Such entitlement information can be included in a non-resident font installation request. If the user is authorized to install the selected font, font access engine 124 then transmits complete character information, or the above mentioned delta character information, for the selected non-resident font to computing device 100, for installation of the selected non-resident font. Once complete character information is transmitted and installed on computing device 100, the user can apply the font to design work within digital media editor 102. Additionally, once complete character information for the selected non-resident font is installed on computing device 100, it will be appreciated that the selected non-resident font, once installed, will no longer be designated as a non-resident font but instead becomes a local font on local font list 106.

Figure 2:
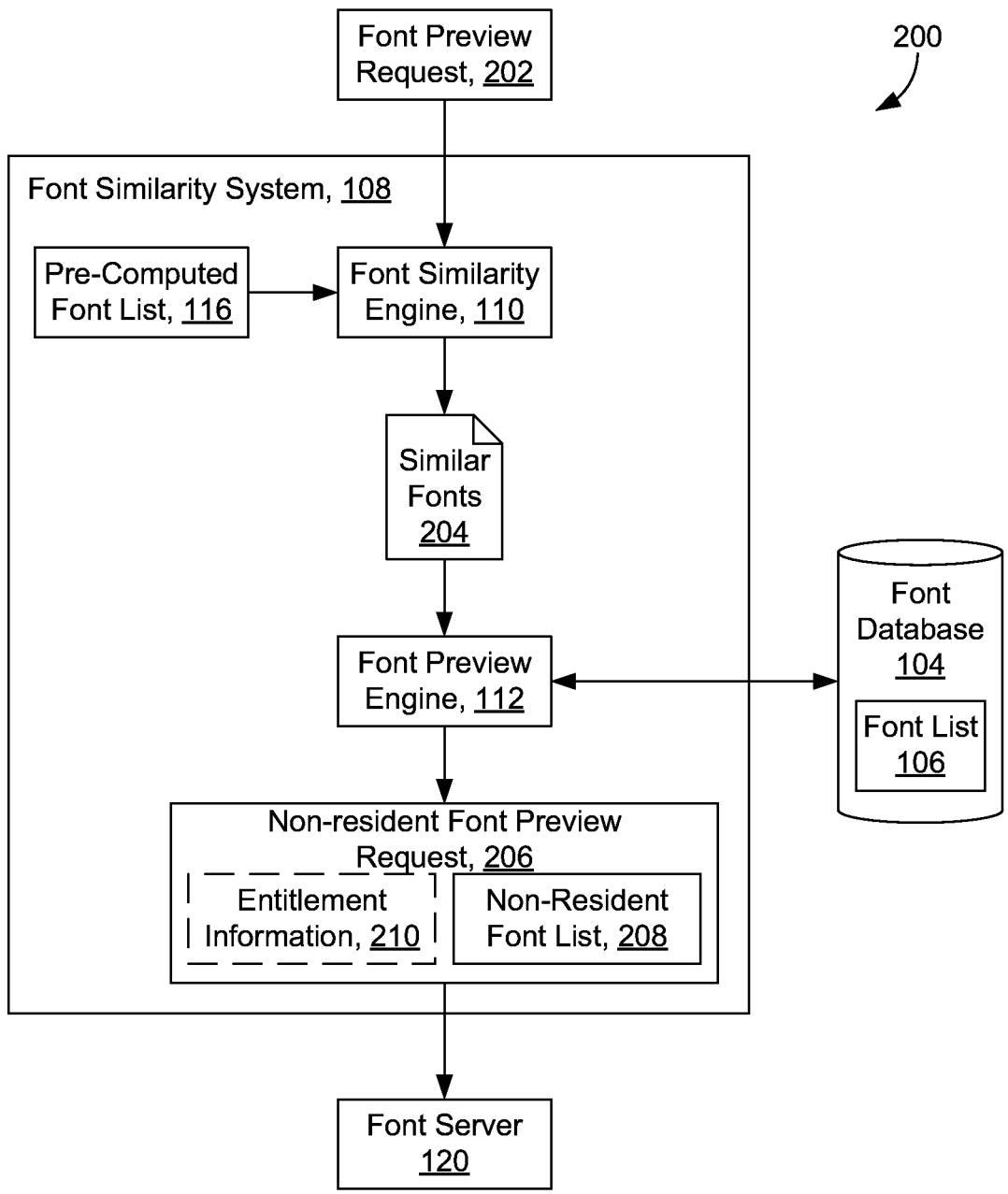
FIG. 2 depicts aspects of the illustrative font similarity system of FIG. 1 performing a non-resident font preview procedure at the computing device level, in accordance with various embodiments of the present disclosure.

FIG. 2 depicts aspects of the illustrative font similarity system 108 of FIG. 1 performing a font preview procedure 200, in accordance with various embodiments of the present disclosure. Because FIG. 2 depicts aspects of font similarity system 108 of FIG. 1, components with like numbering to that represented in FIG. 1 are intended to represent the same or similar components to those discussed in reference to FIG. 1. As depicted, font preview procedure 200 can involve, among other components, font similarity engine 110, pre-computed font list 116, font database 104, and font server 120.

As depicted, font similarity system 108 receives a font preview request 202. Such a request can be received, for example, in response to input from a user of digital media editor 102 requesting to preview fonts (e.g., a list of fonts) that are similar to a font selected by the user. As depicted, such a request can be received by font similarity engine 110 of the font similarity system 108. In embodiments, font preview request 202 includes an identifier (e.g., font name, or other unique identifier) of the font selected by the user. Such an identifier can be utilized in determining a collection of fonts that are similar to the selected font. In response to receiving font preview request 202, font similarity engine 110 can extract the identifier included within font preview request 202. Font similarity engine 110 can then cross-reference the extracted identifier with the font identifiers included within pre-computed font list 116 to identify a font representation (e.g., feature vector) that is correlated with the extracted identifier.

Once a font representation for the extracted identifier is identified by font similarity engine 110, the identified representation can be utilized to determine a collection of fonts (e.g., similar fonts 204) that are similar to the identified representation. To accomplish this, font similarity engine 110 can be configured to compare the identified representation with each of the remaining font representations included within pre-computed font list 116 using a font similarity score. As with the font similarity score described in reference to FIG. 1, such a font similarity score is indicative of how similar, or dissimilar, other fonts are to the selected font. The font similarity score can be determined by calculating, for example, an inner product or Euclidean distance between the font representation of the selected font and the font representation of the other fonts. When calculating the inner product, a larger number would be indicative of two font representations being more similar than a smaller score. When calculating a Euclidean distance, a smaller score would be indicative of two font representations being more similar than a larger score. It should also be appreciated that in some embodiments, a threshold value, or threshold of similarity, is used to select fonts that are similar to the selected font. In such embodiments, fonts with a score above (e.g. for embodiments utilizing an inner product as the similarity score) or below (e.g. for embodiments utilizing a Euclidean distance as the font similarity score) a specified threshold value are determined to be similar. Such a threshold value could be determined in any suitable manner, such as, for example, being pre-defined, being programmatically determined, being based on the number of similar fonts which are to be returned (e.g., top five most similar fonts), etc.

Font preview engine 112 can compare the similar fonts 204 determined by font similarity engine 110 to local font list 106 in font database 104 to determine which similar fonts are resident, or installed for use locally. After determining which fonts are resident, font preview engine 112 can generate a non-resident font list (e.g., non-resident font list 208) identifying fonts from similar fonts 204 that are non-resident or have yet to be installed for use locally. Font preview engine 112 can then generate a non-resident font preview request 206 that includes non-resident font list 208. Non-resident font list 208 includes all similar fonts that are absent from local font list 106. Absent, as used in this context, means that the font is not yet installed on the local system for use. In addition to non-resident font list 208, in some embodiments, non-resident font preview request 206 can also contain entitlement information 210, such as that discussed elsewhere herein. Non-resident font preview request 206 can then be sent to font server 120 by font similarity system 108 on computing device 100.

Figure 3:
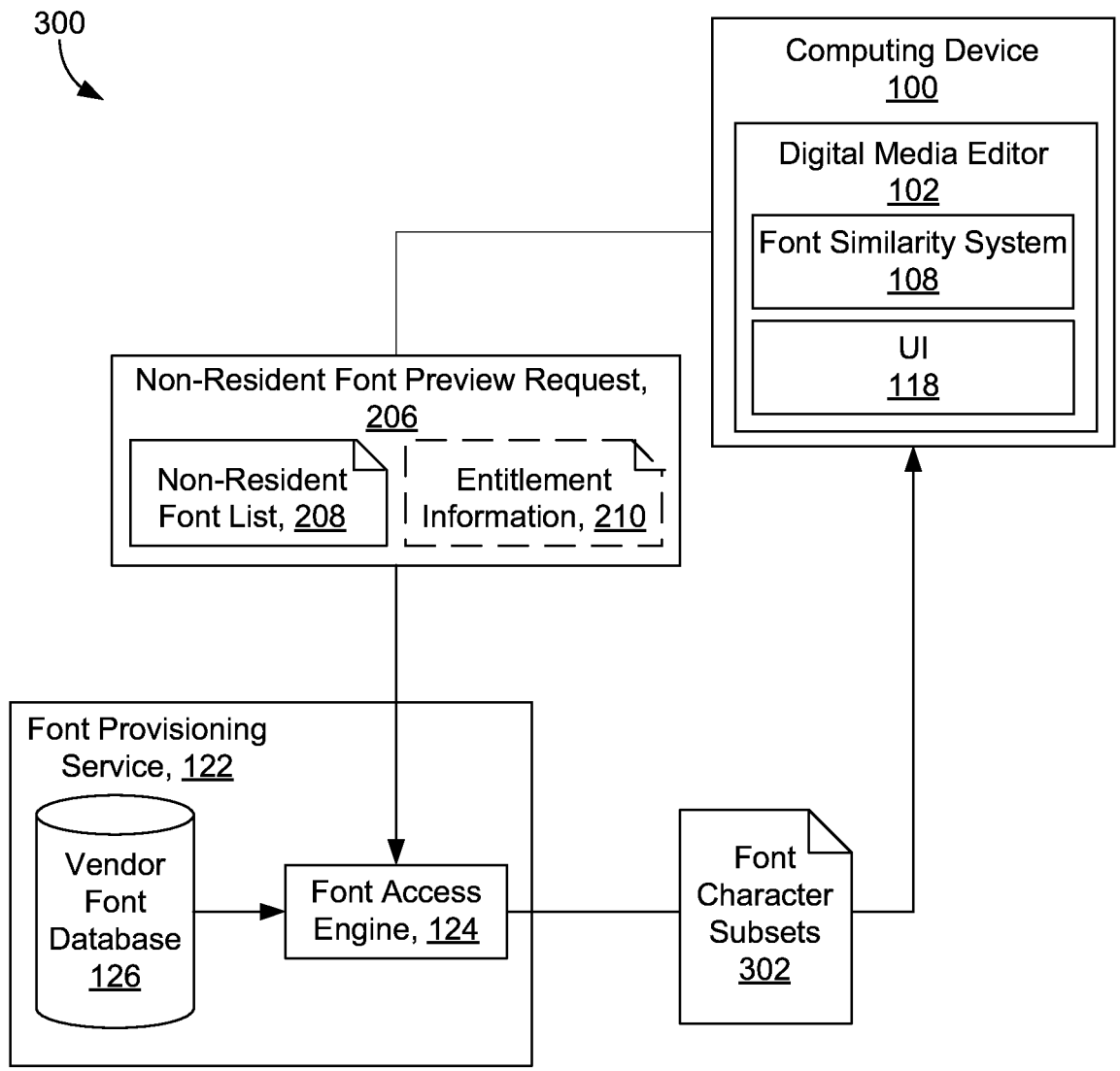
FIG. 3 depicts aspects of the illustrative font similarity system of FIG. 1 performing a font preview procedure at the font server level, in accordance with various embodiments of the present design.

FIG. 3 depicts aspects of the illustrative font similarity system 108 of FIGS. 1 and 2 performing a portion 300 of a, in accordance with various embodiments of the present disclosure. Because FIG. 3 depicts aspects of font similarity system 108 of FIGS. 1 and 2, components with like numbering to that represented in FIGS. 1 and 2 are intended to represent the same or similar components to those discussed in reference to FIGS. 1 and 2. As depicted, font preview procedure 200 can include, among other components, vendor font database 126, font access engine 124, and computing device 100.

Font access engine 124 can be configured to analyze non-resident font preview request 206 sent from font similarity system 108 on computing device 100, as described in reference to FIG. 2. In embodiments, non-resident font preview request 206 includes non-resident font list 208. Non-resident font list includes identifies for those fonts that have been determined to be similar to a selected font, but have yet to be installed on computing device 100 for use by a user. Font access engine 124 can then extract the font identifiers from non-resident font list 208.

Font access engine 124 can utilize the extracted font identifier to identify font information for each of the identified fonts. Foe each of these identified fonts, font access engine 124 can extract a subset of character information to produce font character subset 302. The font character subsets 302 includes, for instance, characters (e.g., glyphs) for the fonts identified on the non-resident font list. For instance, the subset of character information could be the characters (e.g., glyphs) required to spell a certain word associated with the preview, for example, 'SAMPLE' or spell out the font name. In a further embodiment, the information extracted from non-resident font preview request 206 includes a request for a specific subset of character information so that a user is enabled to preview a specific word or words that make up the design being created in digital media editor 102. Once the font character subsets 302 have been produced, font access engine 124 can send the font character subsets 302 back to computing device 100 to satisfy non-resident font preview request 206.

In further embodiments, non-resident font preview request 206 can also include entitlement information 210. In such embodiments, font access engine 124 can extract the entitlement information 210, in addition to the non-resident font list 208, from non-resident font preview request 206. The entitlement information can be utilized to determine a user access level associated with a user of computing device 100 that initiated the non-resident font preview request 206. As such, the entitlement information can include user credentials (e.g., username and password) that can be utilized to determine the user access level. The user access level can identify, for example, a font subscription level to which the user belongs, individual fonts to which the user has access, etc.

In embodiments with entitlement information 210, font access engine 124 can compare the user access level determined utilizing the entitlement information 210 with the font access level in vendor font database 126 for each font on non-resident font list 208 to identify a list of authorized fonts, which a user is entitled to preview and/or install. Font access engine 124 can process an authorized font list to generate the font character subsets 302 for fonts included on the authorized font list. Font access system 124 then transmits the font character subsets 302 to computing device 100 where a user is able to preview the authorized font(s) within digital media editor 102 utilizing user interface 118.

Figure 4:
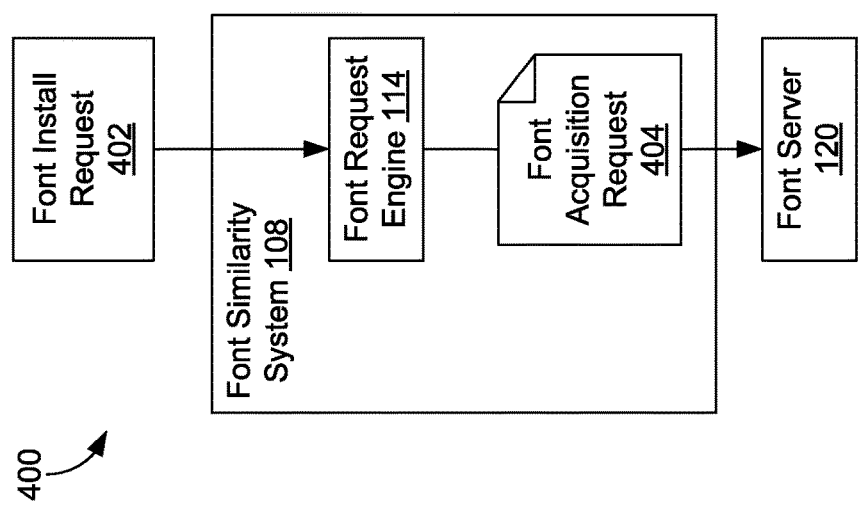
FIG. 4 depicts aspects of the illustrative font similarity system of FIG. 1 performing a font access request procedure at the computing device level, in accordance with various embodiments of the present disclosure.

FIG. 4 depicts aspects of the illustrative font similarity system 108 of FIG. 1 performing a font install request procedure 400, in accordance with various embodiments of the present disclosure. Because FIG. 4 depicts aspects of font similarity system 108 of FIG. 1, components with like numbering to that represented in FIG. 1 are intended to represent the same or similar components to those discussed in reference to FIG. 1. As depicted, font install request procedure 400 can include, among other components, font request engine 114 and font server 120.

Font similarity system 108 can be configured to receive a font install request 402. Such a request can be received, for example, in response to input from a user of digital media editor 102 requesting installation of a selected non-resident font that is displayed to the user as part of a font preview discussed elsewhere herein. In one embodiment, a user can make such a request via interaction with a selection component displayed in a user interface next to the font preview of the selected non-resident font. For instance, in various embodiments, the selection component could be displayed as an icon. In such embodiments, the user interaction can include the user clicking on the icon which would initiate the font install request. Font request engine 114 generates font acquisition request 404 based on font install request 402, which is then sent to font server 120, as depicted. The information included in font acquisition request 404 can include a font identifier (e.g. font name). In further embodiments, the information included in font acquisition request 404 can include user entitlement information, such as that discussed elsewhere herein, in addition to a selected font name.

Figure 5:
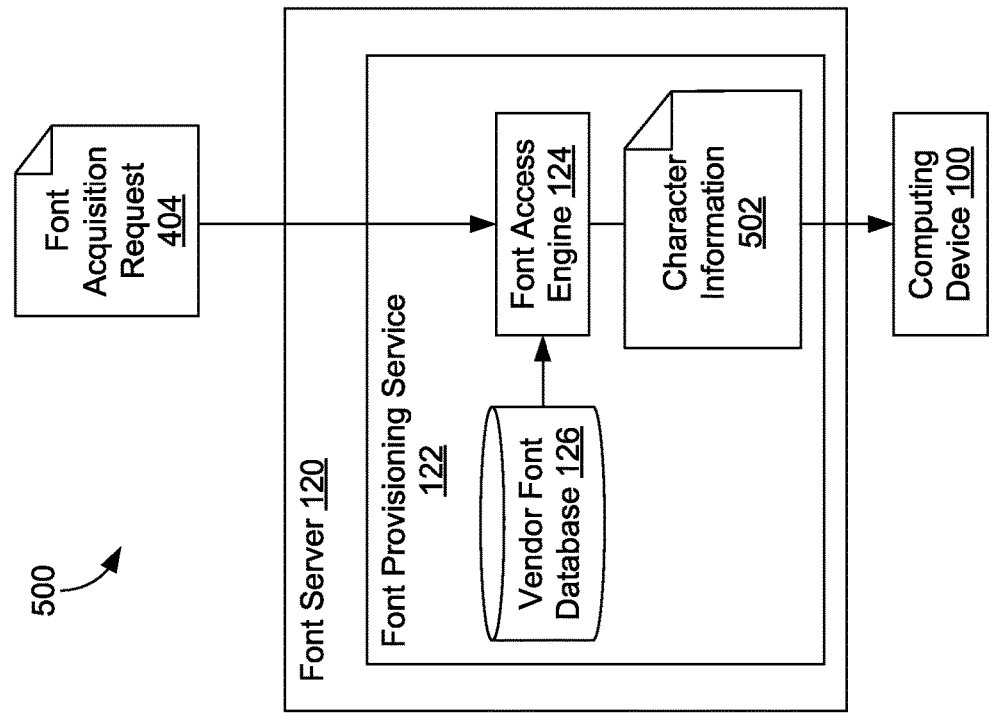
FIG. 5 depicts aspects of the illustrative font similarity system of FIG. 1 performing a font access request procedure at the font vendor level, in accordance with various embodiments of the present disclosure.

FIG. 5 depicts aspects of the illustrative font provisioning service 122 of FIG. 1 performing a font acquisition request procedure 500, in accordance with various embodiments of the present disclosure. Because FIG. 5 depicts aspects of font provisioning service 122 of FIG. 1, components with like numbering to that represented in FIG. 1 are intended to represent the same or similar components to those discussed in reference to FIG. 1. Additionally, because FIG. 5 depicts a continuation of font install request procedure 400 of FIG. 4, components with like numbering to that represented in FIG. 4 are intended to represent the same or similar components to those discussed in reference to FIG. 4. As depicted, font acquisition request procedure 500 can include, among other components, vendor font database 126, and font access engine 124 of font provisioning service 122.

Font access engine 124 can be configured to analyze font acquisition request 404. Font access engine 124 extracts information (e.g., font identifier) included in font acquisition request 404. In an embodiment, such information includes a font identified (e.g., font name). Font access engine 124 utilizes the information extracted from font acquisition request 404 to identify character information (e.g., the glyph sets depicted in FIG. 1) for the requested font. Once the character information has been identified, font access engine can retrieve the character information from vendor font database 126 for the requested font. In some embodiments, character information 502 represents complete character information, which can include each character for a selected font. In other embodiments, character information 502 can include the delta between the complete character information and the subset of character information previously sent for a font preview. This approach can be used to save bandwidth or computing resources by not reprocessing and retransmitting those characters that have already been transmitted. Font provisioning service 122 then transmits character information 502 to computing device 100. Upon installing character information 502 on computing device 100, a user is able to apply the font to a digital design within digital media editor 102.

In some embodiments, the information extracted by font access engine 124 from font acquisition request 404 can also include entitlement information. Such entitlement information can be utilized by the font access engine to identify a user access level associated with the user submitting the font install request. In such embodiments, font access engine 124 can access vendor font database 126 to determine access level information associated with the requested font. Font access engine 124 can compare the user's access level identified from the entitlement information with the access level needed to install the requested font to determine if the user currently has access to install the selected font (e.g., the requested font is within the user's subscription level or the user has previously purchased the requested font).

After determining a user is entitled to install the selected font, font access engine 124 processes the selected font by retrieving character information from vendor font database 126 for the selected font to generate character information 502. In one embodiment, character information 502 can include each character for a selected font. In a further embodiment, character information 502 can be the delta between the complete character information of a selected font and the subset of character information previously sent for a font preview. This approach could be used to save bandwidth or computing resources. Font provisioning system 122 then transmits character information 502 to computing device 100, which can utilize character information to install the requested font. Upon installing character information 502 on computing device 100, a user is able to apply the font to a digital design within digital media editor 102.

Figure 6:
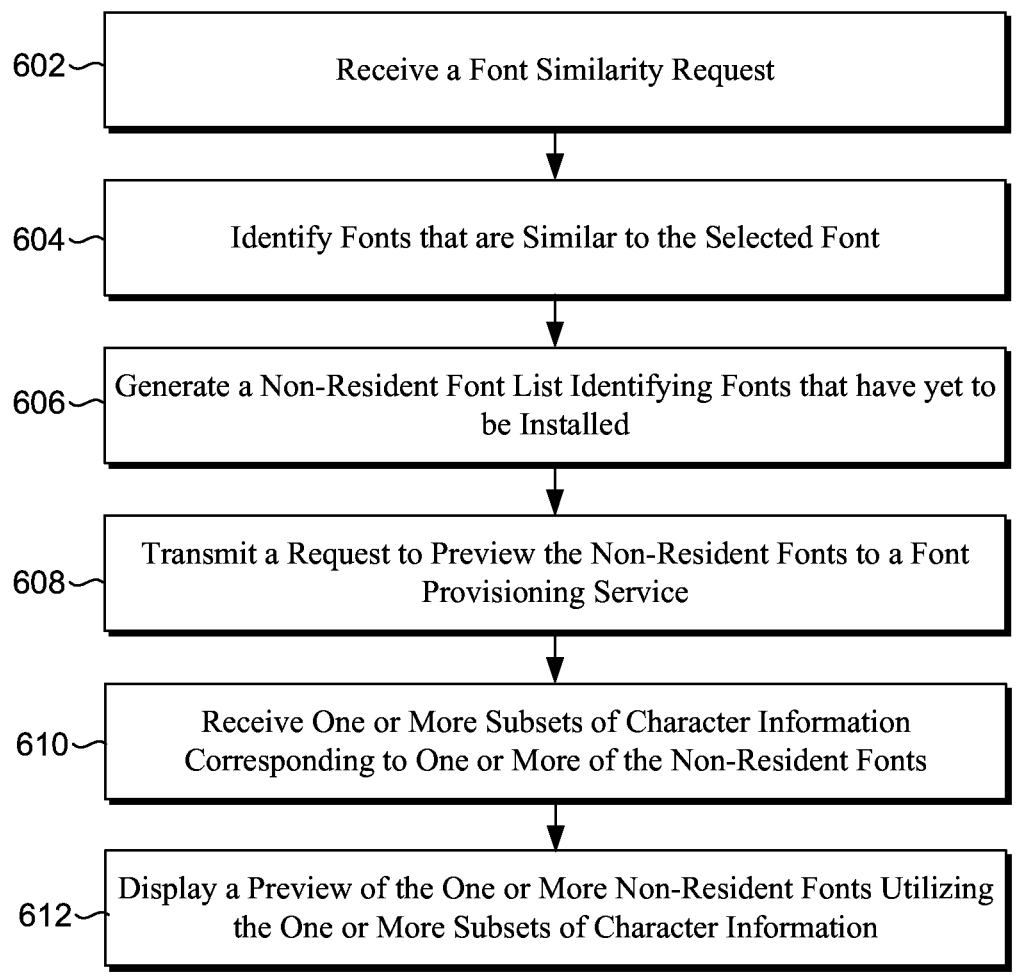
FIG. 6 illustrates a process flow depicting an example font similarity request process at the computing device level, in accordance with various embodiments of the present disclosure.

FIG. 6 illustrates a process flow 600 depicting an example font similarity process in accordance with various embodiments of the present disclosure. Process flow 600 could be carried out, for example by font similarity system 108 of FIGS. 1 & 2.

Process flow 600 begins at block 602 where a font similarity request is received. Such a request can be received, for example, in response to input from a user requesting fonts that are similar to a user selected font. In embodiments, such a request can include an identifier (e.g., font name, or other suitable unique identifier) of the user selected font to facilitate determining a collection of fonts that are similar to a user selected font.

At block 604, fonts similar to the selected font are identified. This can be accomplished utilizing the identifier of the user selected font by cross-referencing the identifier of the user selected font with the font identifiers included within a pre-computed font list (e.g., pre-computed font list 116 discussed above) to identify a font representation (e.g., feature vector) that is correlated with the user selected font.

Once a font representation for the extracted identifier is identified, the identified font representation can be utilized to determine a collection of fonts that are similar to the user selected font. To accomplish this, the identified representation can be compared with each of the other font representations included within the pre-computed font list. In various embodiments, this can be accomplished using a font similarity score, such as that discussed elsewhere herein. Such a font similarity score can be indicative of how similar, or dissimilar, other fonts are to the selected font. The font similarity score can be determined by calculating, for example, an inner product or Euclidean distance between the font representation of the selected font and the font representation of the other fonts. It will be appreciated that the inner product and Euclidean distance are merely meant to be illustrative of possible mechanisms for determining a font similarity score. Any other suitable calculation that can be utilized for comparing similarity of font representations is explicitly contemplated herein and, as such, is within the scope of this disclosure. When calculating the inner product, a larger number would be indicative of two font representations being more similar than a smaller score. When calculating a Euclidean distance, a smaller score would be indicative of two font representations being more similar than a larger score. It should also be appreciated that in some embodiments, a threshold value, or threshold of similarity, is used to select fonts that are similar to the selected font. In such embodiments, fonts with a score above (e.g. for embodiments utilizing an inner product as the similarity score) or below (e.g. for embodiments utilizing a Euclidean distance as the font similarity score) a specified threshold value are determined to be similar. Such a threshold value could be determined in any suitable manner, such as, for example, being pre-defined, being programmatically determined, being based on the number of similar fonts which are to be returned (e.g., top five most similar fonts), etc.

Moving to block 606, a non-resident font list is generated that identifies fonts that have yet to be installed on the user's system. To accomplish this, the collection of similar fonts determined in block 604 can be compared against a list of fonts that are currently installed on the system (e.g., local font list 106, discussed above) to determine which of the collection of similar fonts are resident, or installed for use locally. After determining which fonts are resident, the non-resident font list can be generated based upon those fonts that are not found to be currently installed on the user's system.

At block 608 a request (e.g., non-resident font preview request 206, discussed above) to preview the non-resident fonts can then be submitted to a font provisioning service (e.g., font provisioning service 122). In some embodiments, such a request can include entitlement information. Such an embodiment is described in greater detail above in reference to FIGS. 1 and 3. In response to the request, at block 610 one or more subsets of character information (e.g., glyphs) corresponding with one or more of the non-resident fonts can be received. Finally, at block 612, the one or more subsets of character information can be utilized to display a preview of the non-resident fonts for the user. In various embodiments, the preview of non-resident fonts can be in conjunction with a preview of resident fonts. In some embodiments, the non-resident fonts can be restricted based upon an access level associated with the user. In other embodiments, the user can access any non-resident fonts for preview, but may be prompted for payment (e.g., to purchase a specific font or upgrade a subscription to include a specific font) should the user elect to install a font which the user is not entitled to install. These embodiments are discussed in greater detail above.

Figure 7:
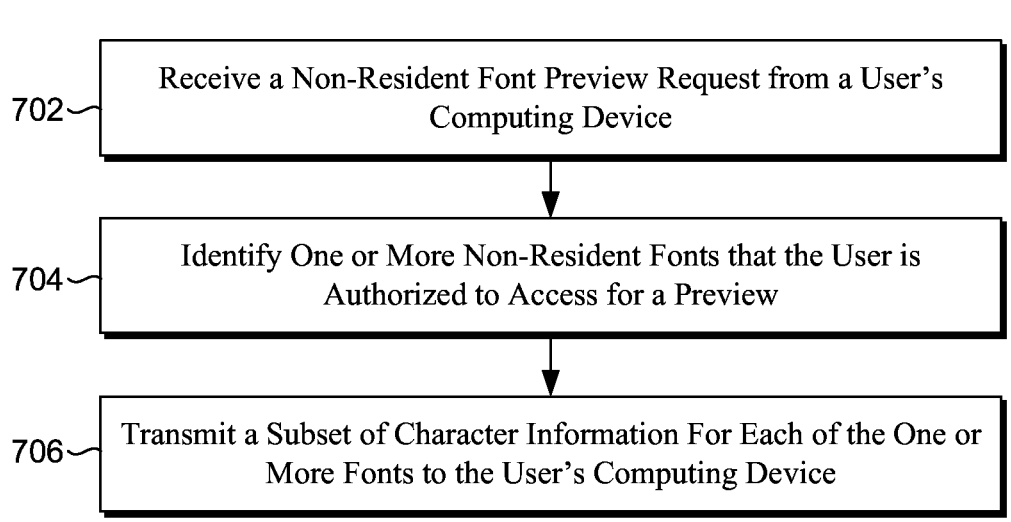
FIG. 7 illustrates a process flow depicting an example non-resident font preview request process at the font server level, in accordance with various embodiments of the present disclosure

FIG. 7 illustrates a process flow 700 depicting an example font preview process, in accordance with various embodiments of the present disclosure. Such a preview process allows a user to preview non-resident fonts identified on a non-resident font list, such as that produced at block 606 of FIG. 6. Process flow 700 could be carried out, for example, by font provisioning service 122 of FIGS. 1 and 3.

Process flow 700 begins at block 702 where a non-resident font preview request is received from a user's computing device. Such a non-resident font preview request can include a non-resident font list that comprises identifiers of fonts that are similar to a user selected font, but absent from the user's computing device. At block 704 one or more of the non-resident fonts from the non-resident font list can be identified based on whether the user is authorized to access them for a preview. In some embodiments, the user could be restricted to previewing only those fonts which the user is authorized to install. In other embodiments, the user can be authorized to preview all fonts and can be provided with a mechanism to acquire access to install any fonts for which the user is not authorized to install. In such embodiments, the one or more non-resident fonts would include all of the fonts identified by the non-resident font list.

For each of the identified non-resident fonts, a subset of character information can be transmitted back to the user's computing device at block 706. The subsets of character information can enable the user to view a preview of the non-resident fonts. In some embodiments, the subset of characters can include characters to spell out a predefined word (e.g., "sample"), the font name, one or more user, or computer, selected words or phrases (e.g., from a current design composed by the user), or any other suitable subset of characters.

Figure 8:
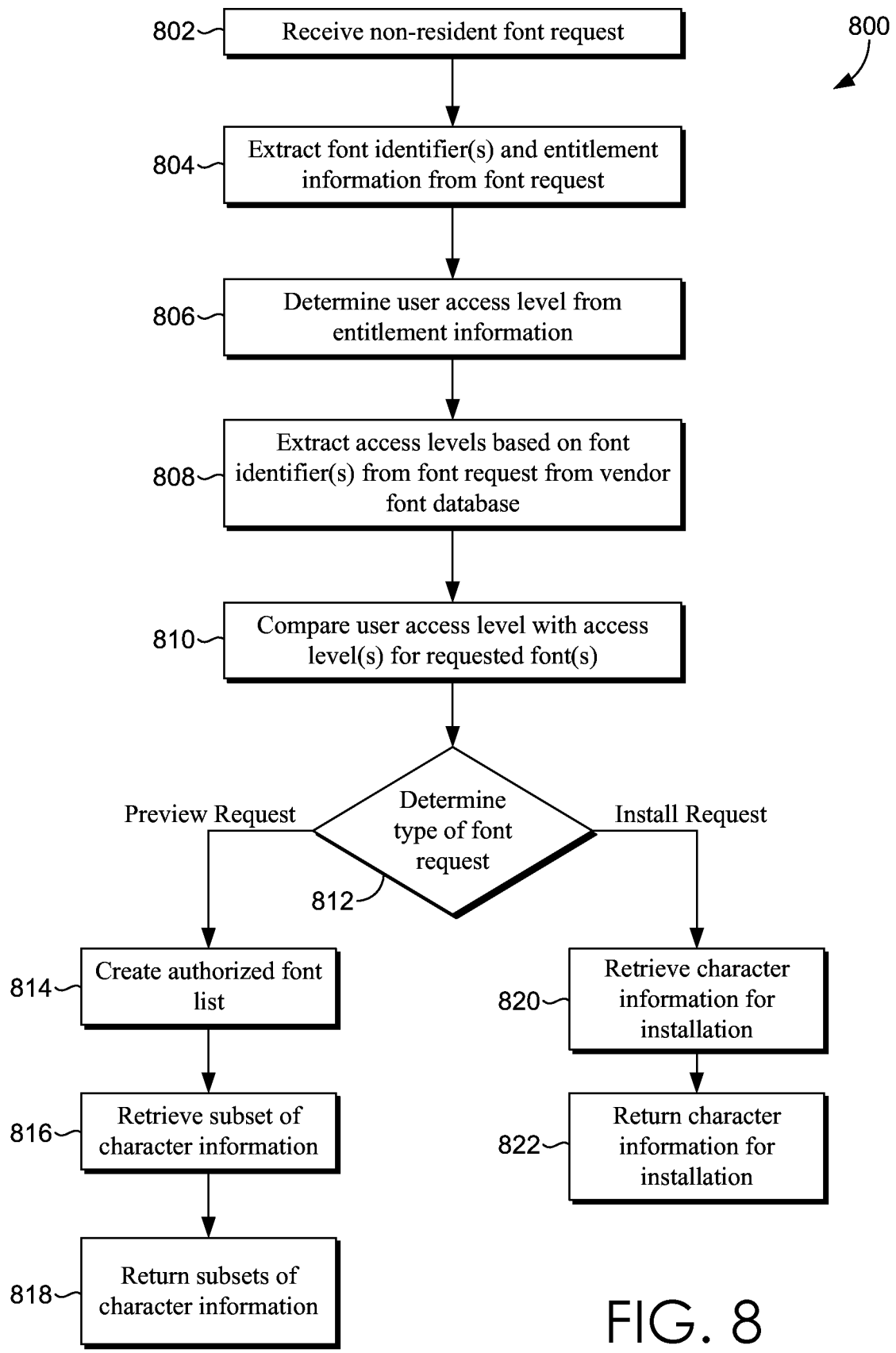
FIG. 8 illustrates a process flow depicting an example non-resident font preview request process at the server level, in accordance with various embodiments of the present disclosure

FIG. 8 illustrates a process flow 800 depicting another example font request process at the font server/vendor level, in accordance with various embodiments of the present disclosure. Process flow 800 can enable a user to either preview or install fonts non-resident fonts. Process flow 800 could be carried out, for example by font provisioning service 122 of FIGS. 1, 3, and 5.

Process flow 800 begins at block 802 where a non-resident font request is received by a font server (e.g., font server 120 of FIGS. 1, 2, and 4). In embodiments, such a request can include an identifier(s) (e.g., font name, or other suitable unique identifier) of fonts on a non-resident font list generated in response to a font similarity request by a user or, in the alternative, a font selected by a user to install. In some embodiments, such a request can also include entitlement information that can be utilized to identify a user's access level to various fonts offered by the font server. For example, this access level can be based on a subscription package a user subscribes to, a free trial period package that comes with a digital media editor, user purchased fonts, etc. For instance, one font vendor is ADOBE® Typekit which offers subscription plans including Free, Portfolio, Performance, Business, and Enterprise.

As such, at block 804, the font identifier(s) included in the non-resident font request can be extracted from the request at block 802. In an embodiment, at block 804, entitlement information, if included in the non-resident font request, can also be extracted from the request at block 802. At block 806, the access level can be determined utilizing the entitlement information extracted at block 804. In one embodiment, the entitlement information includes a token (e.g., a password) and user identification (e.g., username). From this information, a server is able to determine what level of fonts the user has entitlement to access. Moving to block 808, the access levels for each of the font identifier(s) extracted from the request can be identified from the vendor font database. At block 810, the user access level determined from the entitlement information is compared with the access level for each of the requested fonts on the non-resident font list to identify those non-resident fonts which the user is authorized to access. It should be appreciated, that in some embodiments, entitlement information is not included. In such instances blocks 806-810 are not performed. In addition, in some embodiments, the user may be authorized to access any fonts for a preview of the fonts. In such embodiments, the entitlement information would come into play if the user requests to install a font.

At block 812, the non-resident font preview request is analyzed to determine whether the request is for previewing the fonts of a non-resident font list or to install one or more selected non-resident fonts. The requests can be distinguished based upon any number of factors. For example, the request could include an identifier (e.g., preview or install) of a type of request embedded therein.

If the request is determined at block 812 to be a request for previewing a font, then at block 814, a list of authorized fonts is generated based on the access level of the fonts on the non-resident font list and the user's font access level from the entitlement information. It should be appreciated that if no entitlement information is included in a non-resident font preview request, or if a font vendor does not restrict font previews based on entitlement information, then all fonts on the non-resident font list can be considered to be authorized fonts.

For each authorized font, at block 816, a subset of character information is retrieved from a vendor font database (e.g., vendor font database 126 of FIGS. 1, 3, and 5). The subset of character information can be, for example, the characters required to spell out a specific word (e.g., 'sample', 'SAMPLE'), or the font name. In another instances, a subset of character information can be specifically requested in a non-resident font preview request. For example, the characters necessary to spell out a word, or phrase, being used in a user's design being created in a digital media editor (e.g. digital media editor 102.). Finally, at block 818, the subsets of character information for each of the authorized fonts on the non-resident font list are transmitted back to the computing device which submitted the non-resident font request (e.g., computing device 100 of FIGS. 1, 3, and 5).

If the request is determined at block 812 to be a request for installing non-resident fonts, then at block 820, character information for installation is retrieved from a vendor font database (e.g., vendor font database 126 of FIGS. 1, 3, and 5) for the selected non-resident font to enable the installation of the selected non-resident font. Finally, at block 822, the character information for installation of the selected non-resident font is transmitted to back to the computing device which submitted the non-resident font request (e.g., computing device 100 of FIGS. 1, 3, and 5). The transmitted character information can then be installed on the computing device, making the font available for use by the user. As discussed previously, this character information for installation could be complete character information or delta character information. In addition, if it is determined that the user is not authorized to install at least one of the one or more selected fonts, then the user can be prompted to increase a current subscription level to acquire access to the at least one font, or purchase the at least one font.

Figure 9:
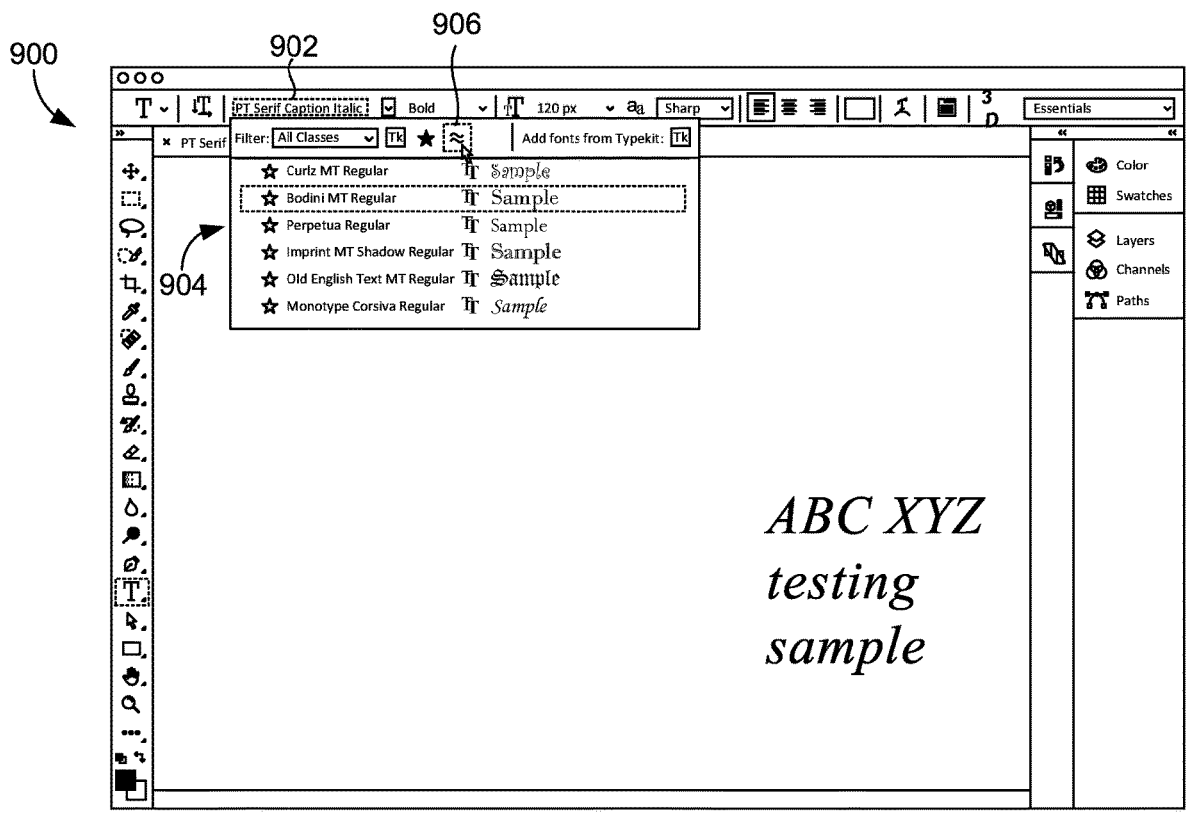
FIG. 9 is a graphical depiction of an illustrative user interface depicting a preview of non-resident fonts from within a design application, in accordance with various embodiments of the present disclosure.
Figure 9:
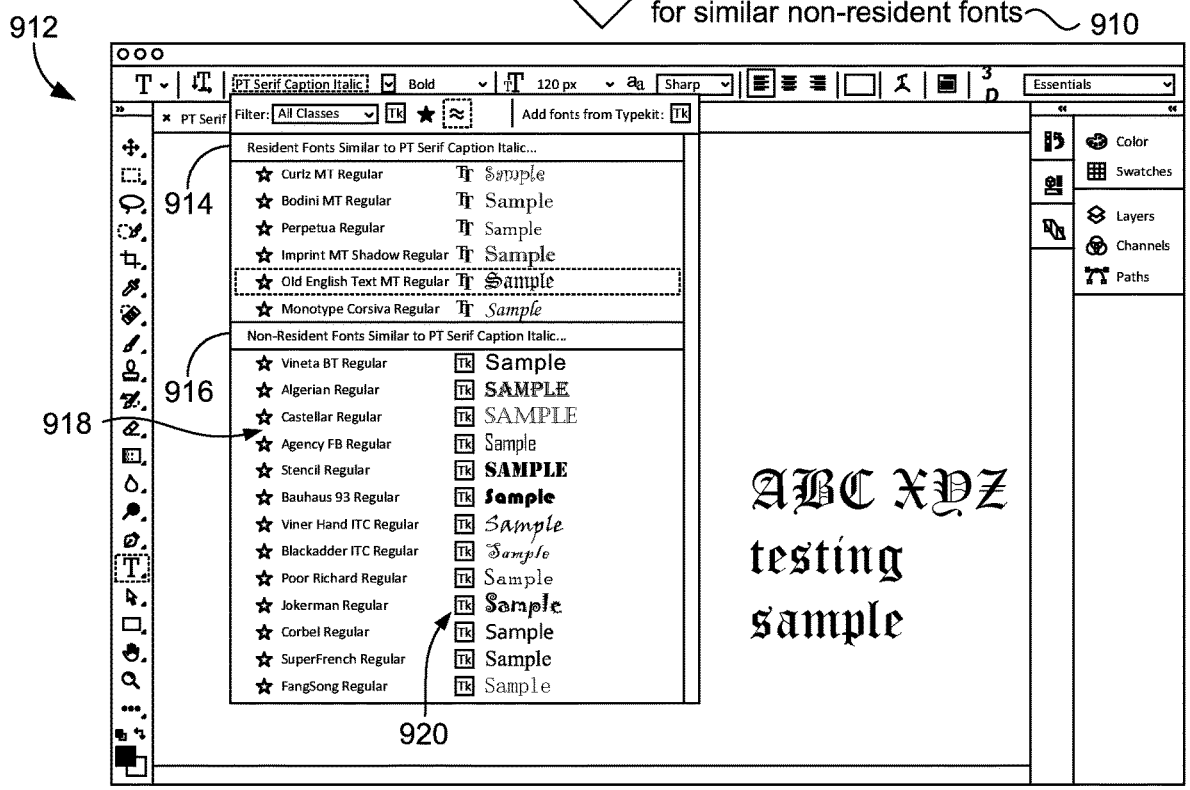

FIG. 9 is a graphical representation of an illustrative user interface 900 depicting the previewing of a collection of similar local fonts 904, in accordance with various embodiments of the present disclosure. As depicted by user interface 900, the collection of similar local fonts 904 includes only local fonts that have been determined to be most similar to a selected font 902, 'PT Serif Caption Italic.' In the depicted embodiment, there is an interactive component 906 which a user can activate (e.g., by clicking) to display previews of similar non-resident fonts in addition to similar local fonts.

Illustrative user interface 900 depicts the previewing of a collection similar local fonts 904. At 910, a subset of character information for similar non-resident fonts is transmitted from a font vendor, this can be in response to user activation of interactive component 906. In response to 910, the collection of similar local fonts 904 depicted in user interface 900 is updated in user interface 912 to reflect both similar resident, or local, fonts 914 and similar non-resident fonts 916. As such, user interface 912 depicts a collection of both similar resident fonts 914 and similar non-resident fonts 916 after a subset of character information for similar non-resident fonts has been received by a computing device (e.g., computing device 100 of FIGS. 1, 3, and 5) from a font vendor (e.g., font server 120 of FIGS. 1, 2, and 4). As depicted in this embodiment, the non-resident fonts are from the font vendor ADOBE® TypeKit, but it should be appreciated that the non-resident fonts can be from any number of font vendors or servers. Additionally, while the non-resident fonts depicted include only ADOBE® TypeKit fonts, it should be appreciated that this is merely meant to be illustrative of a possible configuration and any combination of fonts from various font vendors could be included in the collection of similar non-resident fonts 916 without departing from the scope of this disclosure.

Selection component 918 depicts an interactive component a user can utilize to select a font from the similar non-resident fonts 916 that the user wishes to install. As depicted, selection component 918 depicts a mechanism for acquiring a font without the user needing to leave a digital media editor (e.g., digital media editor of FIG. 1) in which the user is working. In some embodiments, collection of similar fonts 912 can include fonts for which a user does not have access to install. In such embodiments, the user could be presented with an option to acquire the selected font. For example, the user could be prompted, upon activation of selection component 918, for payment to increase a subscription level or for payment to acquire the requested font.

Having described embodiments of the present invention, an example operating environment in which embodiments of the present invention may be implemented is described below in order to provide a general context for various aspects of the present invention. Referring to FIG. 10, an illustrative operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output ports 1018, input/output components 1020, and an illustrative power supply 1022. Bus 1010 represents what may be one or more busses (such as an address bus, data bus, or combination thereof). Although the various blocks of FIG. 10 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 10 is merely illustrative of an example computing device that can be used in connection with one or more embodiments of the present disclosure. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or nonvolatile memory. As depicted, memory 1012 includes instructions 1024. Instructions 1024, when executed by processor(s) 1014 are configured to cause the computing device to perform any of the operations described herein, in reference to the above discussed figures, or to implement any program modules, components, or engines described herein. The memory may be removable, non-removable, or a combination thereof. Illustrative hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Illustrative presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:
1. A computer-implemented method for previewing non-resident fonts, comprising:
   receiving, from a computing device operated by a user, a non-resident font preview request including a non-resident font list identifying non-resident fonts that are within a threshold of similarity to a user selected font and absent from the computing device;
   identifying one or more particular fonts in the non-resident font list that the user is authorized to access;
   transmitting a subset of character information for each of the one or more particular fonts in the non-resident font list, wherein the subsets of character information allow the computer device to display selectable previews for the one or more particular fonts;
   receiving, from the computing device, a request to transfer a chosen font selected via the selectable previews of the one or more particular fonts;
   determining a delta of character information for the chosen font, the delta of character information based on a difference between a set of complete character infor- mation for the chosen font and a transmitted subset of character information of the chosen font; and transmitting, to the computing device, the delta of character information for the chosen font.

2. The computer-implemented method of claim 1, wherein transmitting the subset of character information for each of the one or more fonts causes the computing device to display the preview of the one or more fonts, via the subset of characters, within a design application operating on the computing device.

3. The computer-implemented method of claim 1, further comprising, receiving, from the computing device operated by the user, the non-resident font preview request including entitlement information indicating a level of access associated with the user.

4. The computer-implemented method of claim 3, further comprising, transmitting, to the computing device, a subset of character information for at least one font in the non-resident font list that is outside the level of access indicated by the entitlement information, to enable the user to determine whether to gain access to the at least one font.

5. The computer-implemented method of claim 3, wherein, the subset of character information includes access information for each of the one or more fonts, wherein, the access information for a respective font includes a user subscription level, of a plurality of user subscription levels, required to access the respective font, and wherein the level of access associated with the user corresponds with one of the plurality of user subscription levels.

6. The computer-implemented method of claim 3, further comprising, receiving, from the computing device, a request to acquire access to a chosen non-resident font included in the non-resident font list that is outside the level of access associated with the entitlement information, wherein the request authorizes a payment for acquiring access to the chosen non-resident font.

7. The computer-implemented method of claim 6, further comprising, transmitting, to the computing device, complete character information for the chosen non-resident font upon verification of the payment for acquiring access to the chosen non-resident font.

8. One or more computer-readable storage media having instructions stored thereon, which, when executed by one or more processors of a computing device, cause the computing device to:

receive, by the computing device, input from a user indicating that the user would like to view a list of fonts that are similar to a selected font;

identify fonts that are similar to the selected font, the identified fonts including resident fonts that are present on the computing device and non-resident fonts that are absent from the computing device;

generate a non-resident font list comprising identifiers of the non-resident fonts that are absent from the computing device;

transmit, to a font provisioning service, a request to preview the non-resident fonts;

receive, from the font provisioning service, transmitted subsets of character information for one or more non-resident fonts on the non-resident font list;

install, on the computing device, the transmitted subsets of character information for the one or more non-resident fonts, the transmitted subsets of character information enabling the computing device to display selectable previews of the one or more non-resident fonts using the transmitted subsets of character information;

transmit, to the font provisioning service, a request for access to a chosen non-resident font selected via the selectable previews of the one or more non-resident fonts; and in response to the request, receive a delta of character information for the chosen non-resident font from the font provisioning service, wherein the delta of character information is based on a difference between a set of complete character information for the chosen non-resident font and a transmitted subset of character information for the chosen non-resident font.

9. The one or more computer-readable storage media of claim 8, wherein to generate the non-resident font list, the instructions further cause the computing device to:

retrieve a font representation of the selected font;

determine, via the font representation, a list of similar fonts that are within a threshold of similarity to the selected font; and generate the non-resident font list through identification of fonts to be included on the non-resident font list from the list of similar fonts via a comparison of the list of similar fonts with resident fonts of the computing device.

10. The one or more computer-readable storage media of claim 8, wherein the instructions further cause the computing device to:

generate a preview of resident fonts utilizing character information for the resident fonts that is retrieved from the computing device.

11. The one or more computer-readable storage media of claim 8, wherein the instructions further cause the computing device to:

display, via a user interface, a preview of non-resident fonts via character information utilizing a user interface.

12. The one or more computer-readable storage media of claim 8, wherein the instructions further provide the computing device with a font similarity system to:

generate a user interface that:

displays a first preview of resident fonts via first character information retrieved from the computing device; and displays a second preview of non-resident fonts via second character information retrieved from a font server.

13. The one or more computer-readable storage media of claim 8, wherein the instructions further cause the computing device to:

display, via a user interface, a selection component for selecting one or more non-resident font which the user would like to install on the computing device.

14. The one or more computer-readable storage claim 13, wherein the instructions further cause the computing device to:

detect activation of the selection component for a chosen non-resident font;

in response to detecting the activation, generate the request for access to the chosen non-resident font; and install the delta of character information for the chosen non-resident font on the computing device.

15. The one or more computer-readable storage media of claim 8, wherein the instructions further cause the computing device to:
- display, via a user interface, a distinction between previews of resident fonts and previews of non-resident fonts.

16. The one or more computer-readable storage media of claim 8, wherein the instructions further cause the computing device to:
- display a distinction, via a user interface, between non-resident fonts within a scope of access to which the user is entitled and non-residents fonts that are beyond the scope of access to which the user is entitled.

17. A computing system comprising:
one or more processors; and
one or more computer-readable storage media, coupled with the one or more processors, having instructions stored thereon, which, when executed by the one or more processors, cause the computing system to:
- receive, from a computing device operated by a user, a non-resident font list and entitlement information for the user, the non-resident font list identifying fonts that are absent from the computing device;
- identify one or more particular fonts on the non-resident font list that the user is authorized to access based on an access level associated with the entitlement information;
- transmit to the computing device, a subset of character information for each of the one or more particular fonts, wherein the subset of character information allows the computing device to display selectable previews of the one or more particular fonts using the subset of character information;
- receive, from the computing device, a request to transfer a chosen non-resident font selected from the transmitted one or more particular fonts via the selectable previews;
- determine a delta of character information for the chosen non-resident font, the delta of character information based on a difference between a set of complete character information comprising the chosen non-resident font and the transmitted subset of character information of the chosen non-resident font; and
- transmit, to the computing device, the delta of character information to enable the user to utilize the chosen non-resident font on the computing device.

18. The computing system for claim 17, wherein the instructions further cause the computing system to:
- install the delta of character information for the chosen non-resident font on the computing device.

19. The computing system for claim 17, wherein the instructions further cause the computing system to:
- transmit, to the computing device, a subset of character information for at least one non-resident font in the non-resident font list that is outside the scope of the access level associated with the entitlement information, to enable the computing device to display a preview of the at least one non-resident font via the subset of character information; and
- send a request confirmation confirming the request wherein the request confirmation causes a prompt for payment of at least one of, an access level upgrade to enable access to the chosen non-resident font or a purchase of the chosen non-resident font.

* * * * *

UNITED STATES PATENT AND TRADEMARK OFFICE
CERTIFICATE OF CORRECTION

PATENT NO. : 10,592,590 B2
APPLICATION NO. : 15/229108
DATED : March 17, 2020
INVENTOR(S) : I-Ming Pao et al.

Page 1 of 1

It is certified that error appears in the above-identified patent and that said Letters Patent is hereby corrected as shown below:

In the Specification

In Column 2, Line 34, after "disclosure" insert -- . --.

In Column 2, Line 38, after "disclosure" insert -- . --.

In the Claims

In Column 20, Line 59, Claim 14, after "storage" insert -- media of --.

In Column 21, Line 12, Claim 16, delete "residents" and insert -- resident --, therefor.

In Column 21, Line 28, Claim 17, after "transmit" insert -- , --.

Signed and Sealed this
Twelfth Day of May, 2020

Andrei Iancu
*Director of the United States Patent and Trademark Office*